US006119538A

United States Patent [19]

Chang

[11] Patent Number: 6,119,538

[45] Date of Patent: Sep. 19, 2000

[54] DRIVING PULL ROD ASSEMBLY OF A CENTRAL CONTROL LOCK FOR AUTOMOBILES

[76] Inventor: Chung-I Chang, P.O. Box 82-144, Taipei, Taiwan

[21] Appl. No.: 09/182,480

[22] Filed: Oct. 30, 1998

[51] Int. Cl.[7] .............................. F16H 25/20; E05B 65/36

[52] U.S. Cl. .............................. 74/89.15; 74/411; 292/144; 464/160

[58] Field of Search .............................. 74/89.15, 411; 292/144; 464/160

[56] References Cited

U.S. PATENT DOCUMENTS

| | | | |
|---|---|---|---|
| 3,347,451 | 10/1967 | Vind | 417/415 |
| 4,669,283 | 6/1987 | Ingenhoven | 74/89.15 X |
| 4,728,832 | 3/1988 | Jatnieks et al. | 74/411 X |
| 4,759,192 | 7/1988 | Bertram et al. | 464/160 X |

*Primary Examiner*—Allan D. Herrmann
*Attorney, Agent, or Firm*—A & J

[57] ABSTRACT

A driving pull rod assembly of a central control lock for automobiles includes a U-shaped frame having a top and a bottom respectively provided with a protuberance, a slide slidably fitted within the U-shaped frame and formed with a longitudinal threaded hole, a flange configured to engage with the U-shaped frame, and two stop members at a top and a bottom thereof, a driving gear having a side formed with a recess provided with two oppositely disposed resilient V-shaped members, a tubular lead screw integrally made of plastic and threadedly engaged with the longitudinal threaded hole of the slide, the tubular lead screw including a metal shaft extending therethrough, the metal shaft having an end provided with an engaging member, the engaging member being configured to fit into the recess, and a motor drivingly connected with the driving gear.

1 Claim, 5 Drawing Sheets

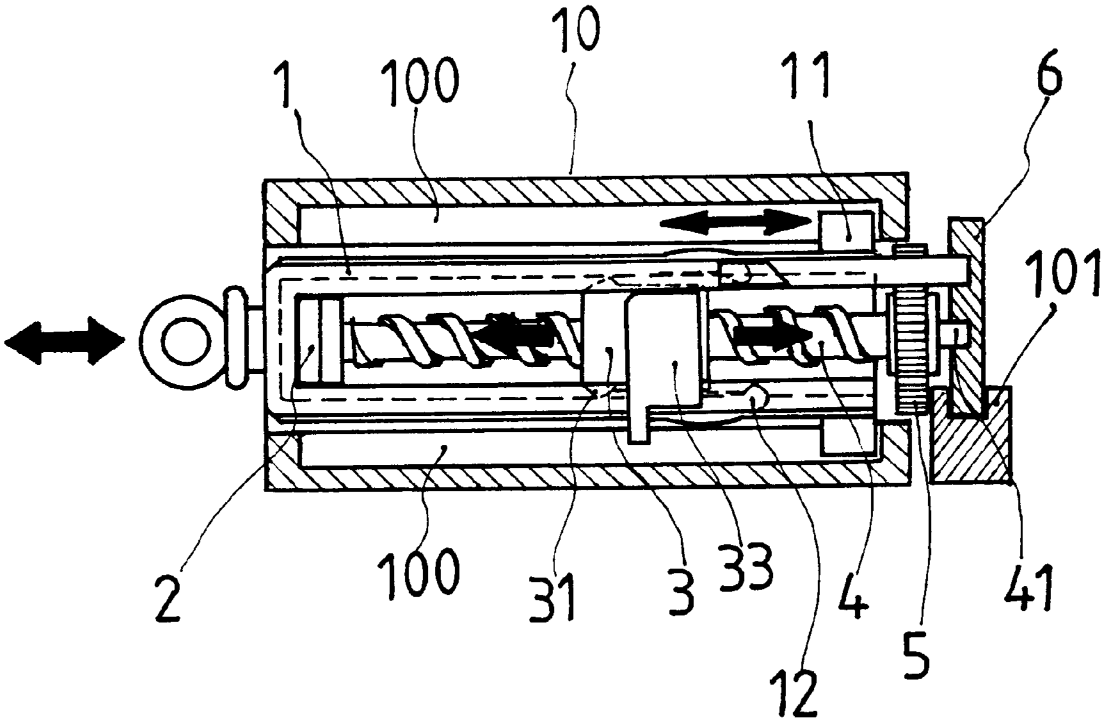
FIG. 4
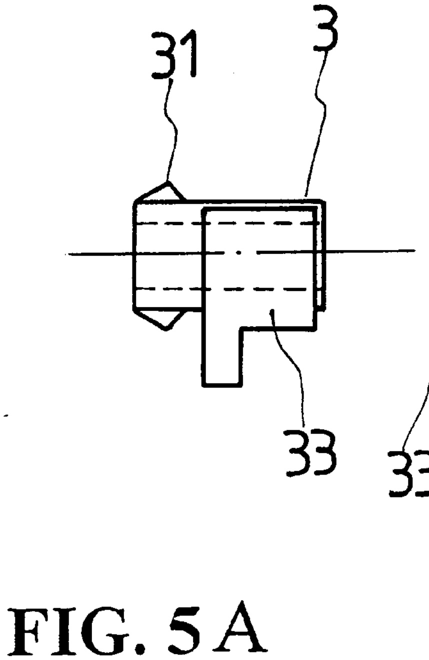
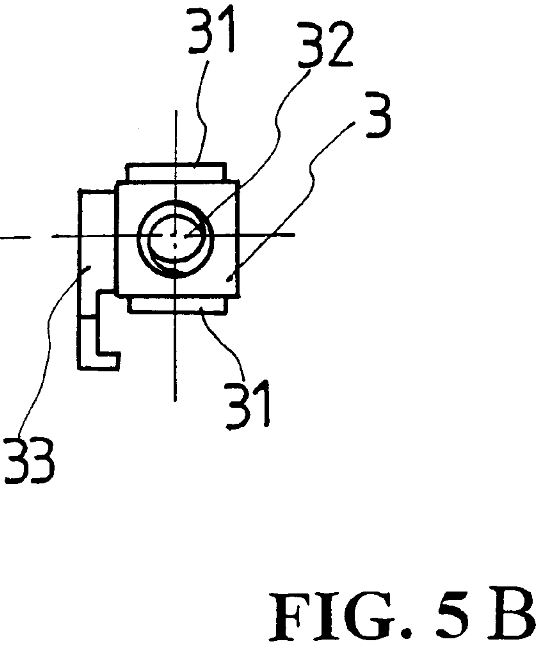
FIG. 5A
FIG. 5B

DRIVING PULL ROD ASSEMBLY OF A CENTRAL CONTROL LOCK FOR AUTOMOBILES

BACKGROUND OF THE INVENTION

1. Field of the Invention

This invention is related to an improved driving pull rod assembly of a central control lock for automobiles.

2. Description of the Prior Art

Referring to FIG. 1, the conventional driving pull rod assembly of a central control lock for automobiles generally includes a pull member A1, A1 a stop A2, a slide A3, a lead screw A4 and a motor A5. However, such a conventional driving pull rod assembly of a central control lock for automobiles still suffers from the present invention:

1. As the slotted portion A12 of the pull member A1 has an open structure, the slide A3 cannot be moved steadily within the pull member A1 so that the rapid movement of the pull member A1 will further influence the steadiness of the slide A3 thereby making the slide A3 easily disengage from the pull member A1 and therefore producing stress to distort the lead screw A4.

2. The slotted portion A12 of the pull member A1 cannot provide an ideal track for the slide A3 and also the pull member A1 does not have a track for sliding movement. Hence, the rapid movement of the pull member A1 will directly cause damage to the slide A3 and the lead screw A4.

3. As the conventional lead screw A4 is integrally made of plastic, it will be relatively weak in strength to resist stress and so the gear A41 of the lead screw A4 or even the whole lead screw A4 will be easily damaged.

4. Since the gear A41 of the lead screw A4 is integrally made with threads A42, there will be no cushioning effect therebetween so that in case of inproper action, the gear A41 or the lead screw A42 will be damaged.

Therefore, it is an object of the present invention to provide an improved driving pull rod assembly of a central control lock for automobiles.

SUMMARY OF THE INVENTION

This invention is related to an improved driving pull rod assembly of a central control lock for automobiles.

It is the primary object of the present invention to provide a driving pull rod assembly of a central control lock for automobiles which can be steadily operated as desired.

It is another object of the present invention to provide a driving pull rod assembly of a central control lock for automobiles which can prevent the slide from disengaging from the assembly.

It is still another object of the present invention to provide a driving pull rod assembly of a central control lock for automobiles which can prolong the service life of the lead screw.

It is still another object of the present invention to provide a driving pull rod assembly of a central control lock for automobiles which can reduce the transient stress to the driving gear from the lead screw.

It is a further object of the present invention to provide a driving pull rod assembly of a central control lock for automobiles which can prevent the driving gear from being damaged.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a sectional view of the driving pull rod assembly of the central control lock for automobiles according to the present invention;

FIGS. 5A and 5B illustrates two views of the slide;

DETAILED DESCRIPTION OF THE PREFERRED EMBODIMENT

Figure 1:
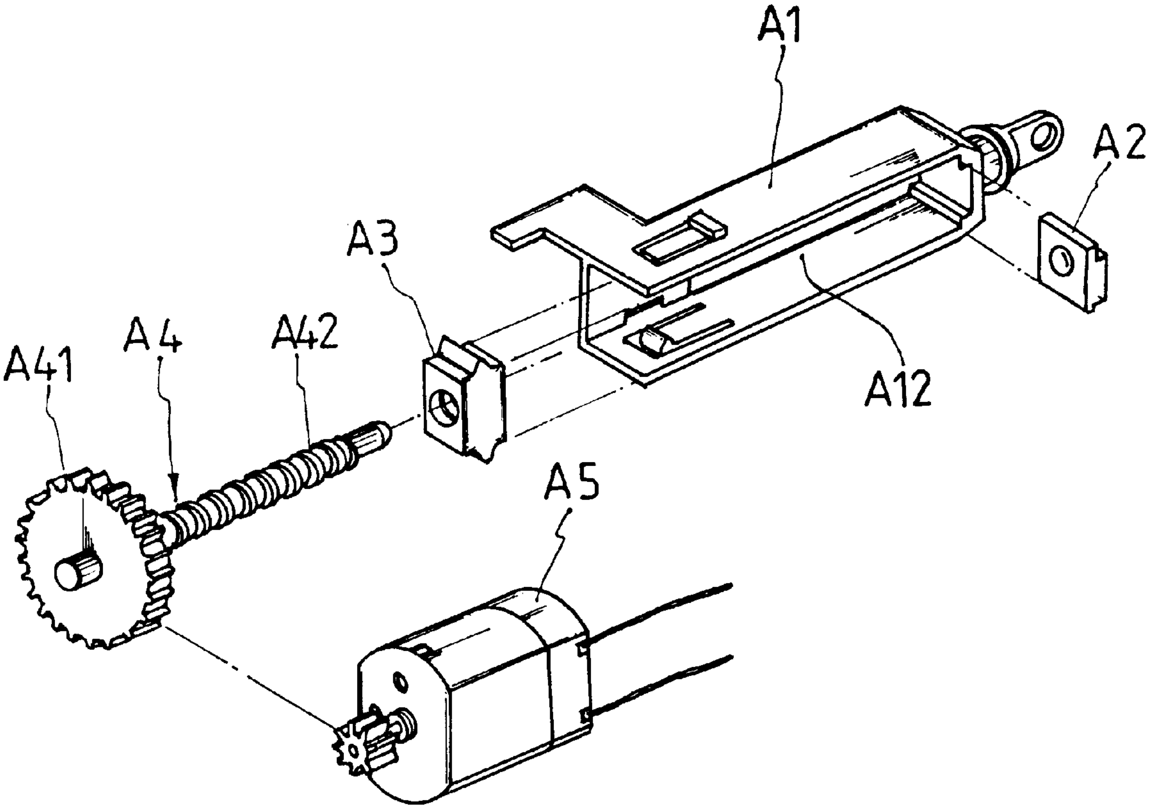
PRIOR ART FIG. 1
FIG. 1 is exploded view of a prior art driving pull rod assembly of a central control lock for automobiles.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
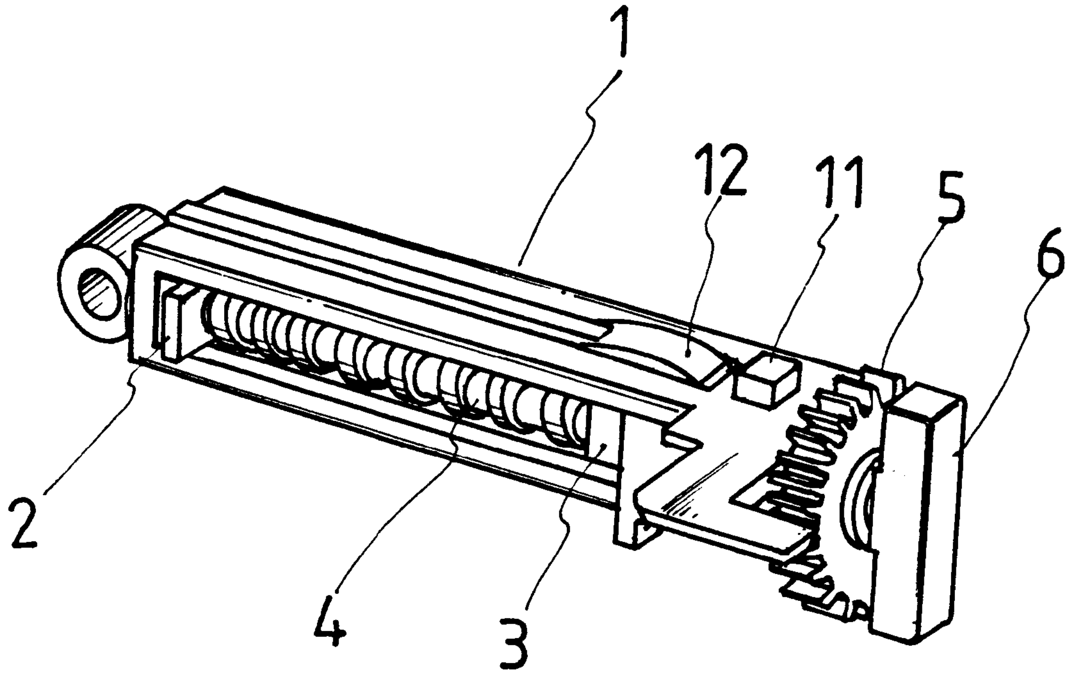
FIG. 2 is a perspective view of a driving pull rod assembly of a central control lock for automobiles according to the present invention.
Figure 3:
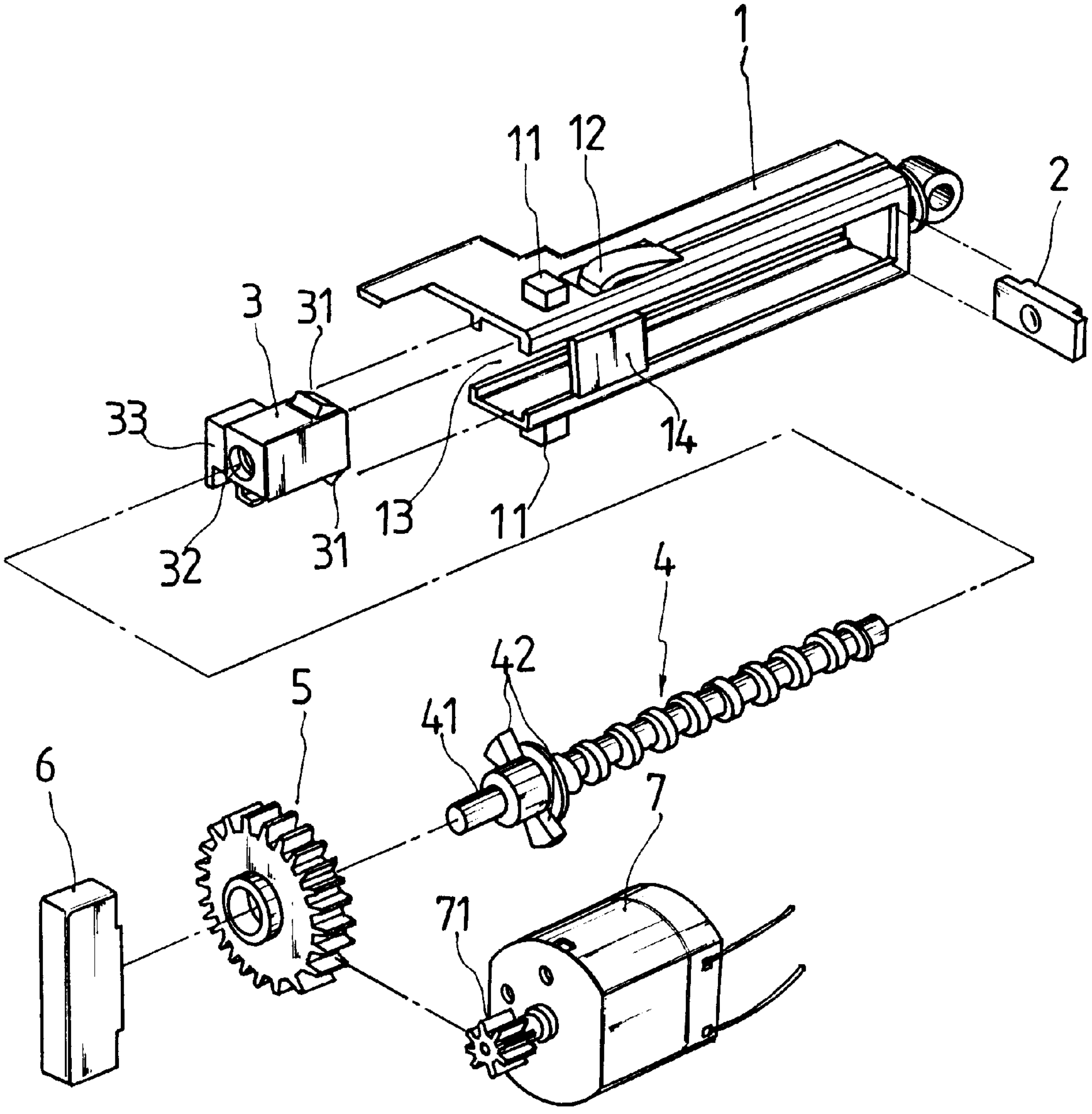
FIG. 3 is an exploded view of a driving pull rod assembly of the central control lock for automobiles according to the present invention.

With reference to the drawings and in particular to FIGS. 2 and 3 thereof, the driving pull rod assembly of a central control lock for an automobile according to the present invention generally comprises a pull rod 1, a stop plate 2, a slide 3, a lead screw 4, a driving gear 5, a positioning block 6 and a motor 7.

As shown in FIGS. 2 and 4, the pull rod 1 is provided with two protuberances 11, one at the top and the other at the bottom. The pull rod 1 is fitted within a housing 10, with the two protuberances 11 slidably engaged with two grooves 100 of the housing 10, so that the pull rod 1 can slide in or out of the housing 10 as desired. Two stoppers 12 are arranged within the pull rod 1 for limiting the stroke of the slide 3.

Referring to FIGS. 4, 5A and 5B, the slide 3 is slidably fitted within a track 13 of the pull rod 1. The slide 3 is provided with a longitudinal threaded hole 32 for engaging the lead screw 4, a flange 33 configured to engage with the track 13, and two stop members 31 one at the top and the other at the bottom.

Figure 6:
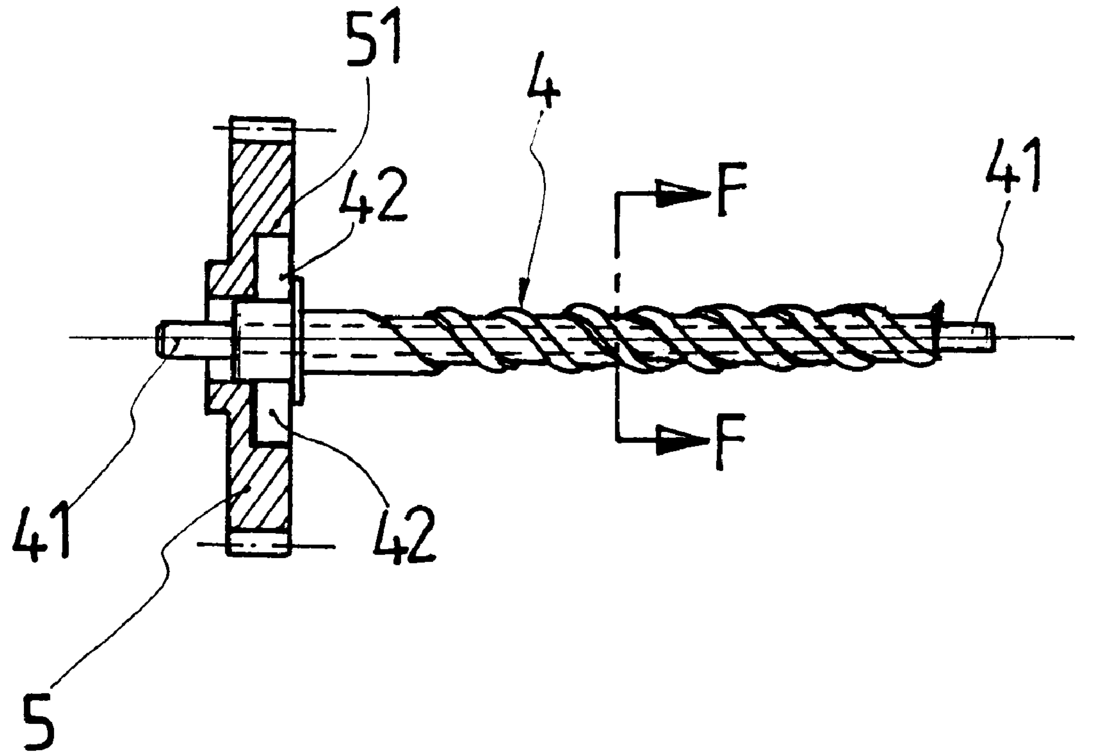
FIG. 6 illustrate the structure of the lead screw.
Figure 7:
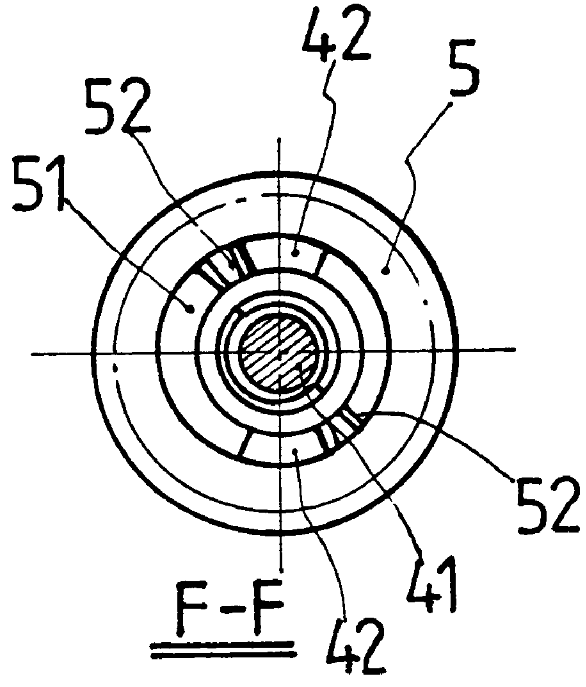
FIG. 7 is a sectional view taken along line 7—7 of FIG. 6.

Turning now to FIGS. 6 and 7, the lead screw 4 is integrally made of plastic, in which is fitted a metal shaft 41.

An end of the lead screw 4 is provided with an engaging member 42 configured to fit into a recess 51 of the driving gear 5. The recess 51 is provided with two resilient V-shaped members 52 arranged at two opposite sides thereof so that when the driving gear 5 is driven by the motor 7 to rotate the lead screw 4, the resilient V-shaped members 52 will cushion the impact from the engaging member 42 of the lead screw 4. An end of the metal shaft 41 extends through the driving gear 5 to engage with the positioning block 6. The positioning block 6 is inserted in a fixed block 101 (see FIG. 4) so that the positioning block 6 is kept at a fixed position.

The driving gear 5 is engaged with an output gear 71 of the motor 7 so that when the motor 7 is turned on, the driving gear 5 will be rotated thereby turning the lead screw 4.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A driving pull rod assembly of a central control lock for automobiles comprising:

a U-shaped frame (1) having a top and a bottom respectively provided with a protuberance (11);

a slide (3) slidably fitted within said U-shaped fame and formed with a longitudinal threaded hole (32), a flange (33) configured to engage with said U-shaped frame, and two stop members (31) at a top and a bottom of said slide;

a driving gear (5) having a side formed with a recess (51) provided with two oppositely disposed resilient V-shaped members (52);

a tubular lead screw (4) integrally made of plastic and threadedly engaged with said longitudinal threaded hole of said slide, said tubular lead screw including a metal shaft (41) extending therethrough, said metal shaft having an end provided with an engaging member (42), said engaging member being configured to fit into said recess; and a motor (7) drivingly connected with said driving gear.

* * * * *